(12) United States Patent
Kim

(10) Patent No.: US 7,776,469 B2
(45) Date of Patent: Aug. 17, 2010

(54) SECONDARY BATTERY HAVING A CURRENT COLLECTING PLATE WITH IMPROVED WELDING CHARACTERISTICS

(75) Inventor: Hyon-Sok Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1182 days.

(21) Appl. No.: 11/166,512

(22) Filed: Jun. 23, 2005

(65) Prior Publication Data
US 2005/0287433 A1 Dec. 29, 2005

(30) Foreign Application Priority Data
Jun. 25, 2004 (KR) .................. 10-2004-0048157

(51) Int. Cl.
*H01M 2/00* (2006.01)
*H01M 2/02* (2006.01)
(52) U.S. Cl. ...................... 429/163; 429/169
(58) Field of Classification Search .............. 429/94, 429/161
See application file for complete search history.

(56) References Cited

U.S. PATENT DOCUMENTS 5,773,164 A * 6/1998 Venkatesan et al. ......... 429/161
2002/0142211 A1 * 10/2002 Nakanishi et al. ............ 429/94

FOREIGN PATENT DOCUMENTS

| CN | 1423844 A | 6/2003 |
| JP | 63-3064 U | 1/1988 |
| JP | 11-97034 A | 4/1999 |
| JP | 2002-42769 | 2/2002 |
| JP | 2003-007346 | 1/2003 |
| JP | 2004-71266 A | 3/2004 |
| KR | 2001-0021245 | 3/2001 |

OTHER PUBLICATIONS

Patent Abstracts of Japan, Publication No. 2002-042769; Publication Date: Feb. 08, 2002; in the name of Makuchi et al.
Korean Patent Abstracts, Publication No. 1020010021245; Publication Date: Mar. 15, 2001; in the name of Kouichi et al.

* cited by examiner

*Primary Examiner*—Dah-Wei D Yuan
*Assistant Examiner*—Zachary Best
(74) *Attorney, Agent, or Firm*—Christie, Paker & Hale, LLP

(57) ABSTRACT

The present invention provides a secondary battery including an electrode assembly comprising positive and negative electrodes with a separator interposed therebetween and wound together, a case, a cap assembly, and a negative current collecting plate. The negative current collecting plate includes a partially surface-treated region for fixing the negative current collecting plate to the negative electrode. The partially surface-treated region comprises a metal other than the metal of the negative current collecting plate. The use of a metal other than the metal of the negative current collecting plate provides an improved weld between the negative current collecting plate and the negative electrode which in turn provides improved battery performance, especially for high-load batteries.

17 Claims, 4 Drawing Sheets

SECONDARY BATTERY HAVING A CURRENT COLLECTING PLATE WITH IMPROVED WELDING CHARACTERISTICS

CROSS REFERENCE TO RELATED APPLICATION

This application claims priority to and the benefit of Korean patent application No. 10-2004-0048157 filed in the Korean Intellectual Property Office on Jun. 25, 2004, the entire disclosure of which is incorporated herein by reference.

FIELD OF THE INVENTION

The present invention relates to a secondary battery, and more particularly, to a secondary battery with a current collecting plate with improved welding characteristics.

BACKGROUND OF THE INVENTION

According to usage and battery capacity, secondary batteries are classified as low-capacity secondary batteries, often referred to as "small batteries," which use a single or several battery cells packaged in the form of a pack, and high-capacity batteries, often referred to as "large batteries," which use scores of battery cells packaged into a battery pack.

Small batteries are used as the power source for small electronic devices, such as mobile phones, laptop computers, and camcorders, while large batteries are used as the power source for driving motors in hybrid vehicles and the like.

Small batteries are commonly formed as a prismatic or cylindrical shape when formed with a single cell, and are fabricated by inserting an electrode assembly into a container with a predetermined shape after forming the electrode assembly as a jelly-roll by spirally winding positive and negative electrodes with a separator interposed as an insulator therebetween.

The above positive and negative electrodes have lead terminals, that is, conductive tabs, to collect a current generated therefrom when the battery is operating. In further detail, these conductive tabs are fixed onto the electrode assembly by welding to induce the current generated from the positive and negative electrodes to each positive and negative terminal.

However, when this structure of small batteries is directly applied to large batteries, the operation characteristics of the large batteries are not fulfilled with respect to electric capacity and power. Therefore, a multi-tab structure for attaching a plurality of tabs to an electrode assembly has been suggested in Japanese Patent Laid-Open No. 2003-7346. Here, secondary batteries have a structure where a plurality of tabs formed in one direction of the electrode assembly are combined with an internal terminal, which is connected to an external terminal.

These tabs of a secondary battery are formed as a single body with a current collector or are welded to the current collector after being fabricated separately. However, both structures have their own problems. For example, the tabs formed as a part of a current collector can have difficulties in satisfying the power requirements for large batteries because the material of the current collector tends to be over-consumed. The separately-fabricated tabs also have a disadvantage of needing many working processes. Especially, since the heat generated from the tabs during the welding can have an influence on an electrode assembly, the tabs need to be prepared relatively longer to minimize that influence. Accordingly, the space occupied by the tabs also becomes larger, decreasing the energy density in secondary batteries.

In addition, large batteries used as packs for driving motors require high power characteristics to fulfill their usage. Therefore, tabs need to be designed to minimize the resistances produced during the current collecting process. However, the aforementioned solutions proposed by the conventional art tend to incur relatively increased resistances since they perform current collecting through tabs with small unit areas, resulting in decreased current-collecting efficiency.

SUMMARY OF THE INVENTION

In order to solve the aforementioned problem, the present invention provides a secondary battery with a current collecting plate with improved welding characteristics and increased current collecting efficiency.

The present invention also provides a secondary battery applicable to relevant industries, such as for a hybrid vehicle requiring large batteries for improving its instant power.

The electrode assembly is formed by winding positive and negative electrodes with a separator interposed therebetween. The electrode assembly is combined with the negative current collecting plate. The electrode assembly is placed within a case and the cap seals the assembly and provides an electrical connection to the electrode assembly.

The secondary battery of the present invention is fabricated by fixing the negative current collecting plate into the electrode assembly through a first contact region, the surface of which is partially treated with a metal different from that of the negative collector.

The current collecting plate is also fixed to the case through a second contact region. In one embodiment of the invention, the case is surface-treated with a different metal from the negative current collecting plate. This permits the negative current collecting plate to be easily fixed to the case via the second contact region without the need for surface-treatment at the second contact region of the negative current collecting plate.

In one embodiment of the invention, the second contact region of the negative current collecting plate protrudes toward the case and is formed as a disc-shaped region in the center of the negative current collecting plate.

In one embodiment of the invention, at least two first contact regions are provided extending radially along the negative current collecting plate with the second contact region as a center axis.

According to another embodiment of the present invention, it is advantageous to form a secondary battery as a cylinder after forming the electrode assembly as a cylindrical jelly roll, and it is also advantageous for it to be used for driving a motor by connecting a plurality of such cell batteries in series.

BRIEF DESCRIPTION OF THE DRAWINGS

The accompanying drawings, which are incorporated in and constitute a part of the specification, illustrate embodiments of the invention, and together with the description, serve to explain the principles of the invention, wherein.

DETAILED DESCRIPTION

In the following detailed description, embodiments of the invention have been shown and described simply by way of illustrating various modes of carrying out the invention. As will be realized, the invention is capable of modification in various respects, all without departing from the invention. Accordingly, the drawings and description are to be regarded as illustrative in nature, and not restrictive.

Figure 1:
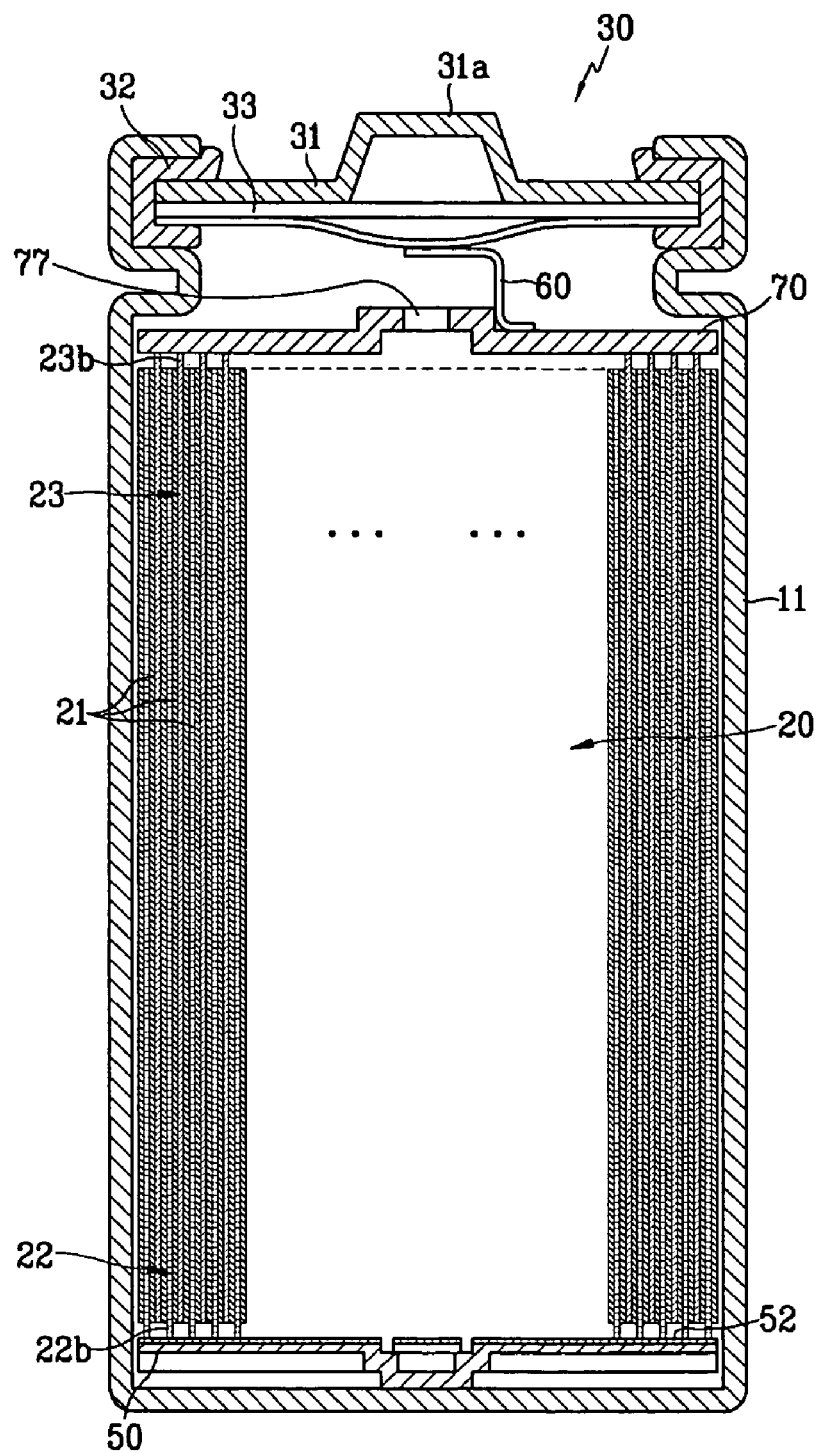
FIG. 1 is a cross sectional view of a secondary battery according to an embodiment of the present invention.
Figure 2:
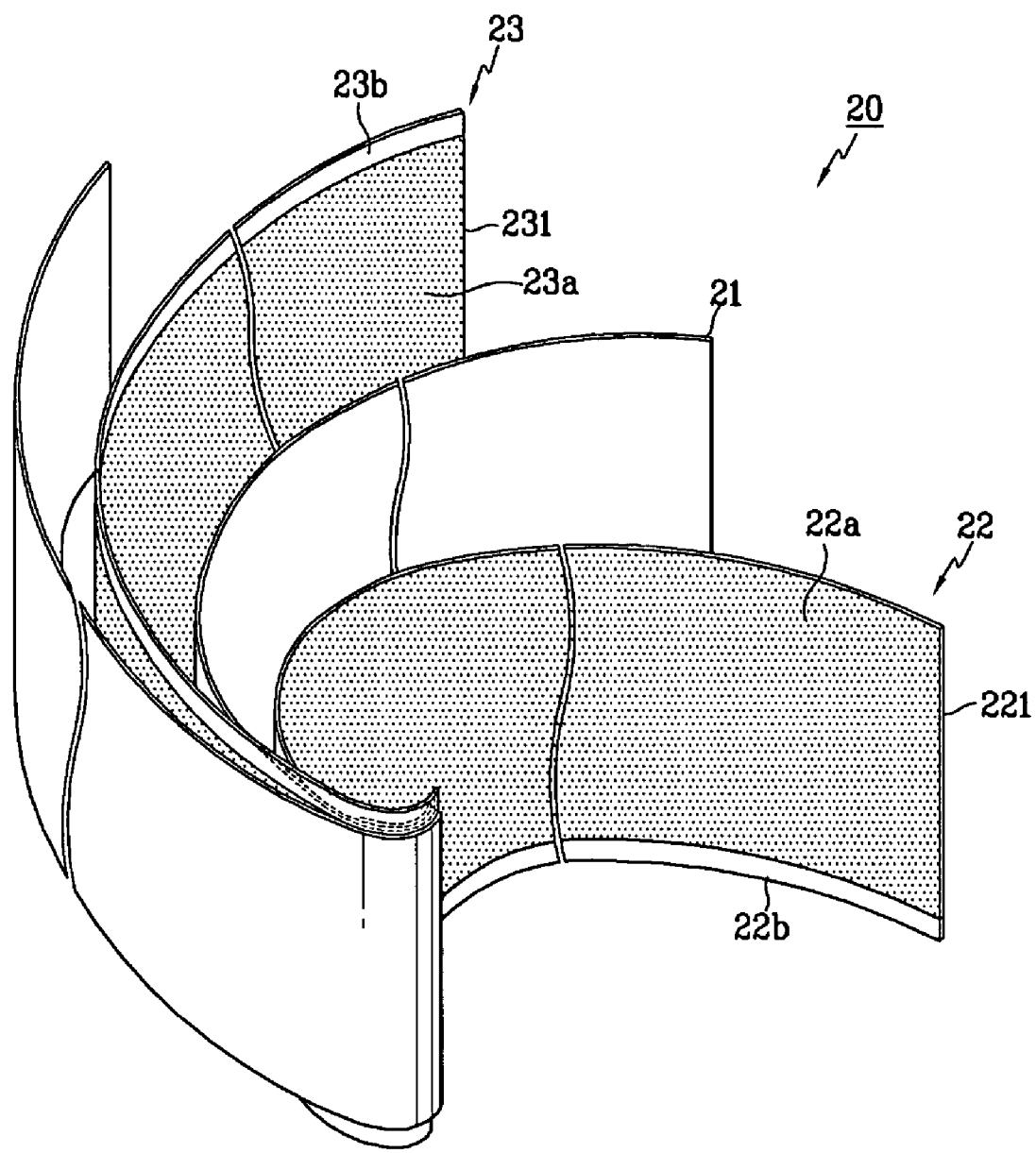
FIG. 2 is a perspective view of an electrode assembly according to an embodiment of the present invention.

FIG. 1 is a cross sectional view of a secondary battery according to an embodiment of the present invention and FIG. 2 is a perspective view of a partially wound electrode assembly. With reference to these drawings, the secondary battery of the present invention is illustrated as follows.

According to one embodiment of the present invention, a secondary battery is fabricated by first forming an electrode assembly 20 by winding a positive electrode 23 and a negative electrode 22 with a separator 21 interposed therebetween into a jelly roll construction. According to this embodiment, uncoated regions 23b, 22b are formed along an edge of each of the positive electrode 23 and the negative electrode 22 such that the uncoated edge 23b of the positive electrode 23 extends out from the top side of the electrode assembly 20 and the uncoated edge 22b of the negative electrode 22 extends out from the bottom side of the electrode assembly 20. A positive current collecting plate 70, and a negative current collecting plate 50 are placed on the top and bottom of the electrode assembly 20.

A case 11 is fabricated of conductive metal formed by plating aluminum or aluminum alloy with an anti-corrosive metal. According to the embodiment illustrated, the case is shaped as an open cylinder into which the electrode assembly 20 including the positive and negative current collecting plates 50, 70 may be inserted. However, the invention is not limited to such a design.

Referring to FIG. 1, the secondary battery includes a cap assembly 30 which includes a cap plate 31 with an external terminal 31a which is electrically connected to the positive current collecting plate 50 by a lead wire. 60. The cap assembly also includes a gasket 32 for insulating the case 11 from the cap plate 30.

In addition, the cap assembly may include a vent plate 33 with a space for buffering an inner pressure and a safety vent (not illustrated in the drawing) for preventing the explosion of a battery by breaking apart and releasing gas at a predetermined pressure level.

Referring to FIG. 2, positive and negative electrodes 23, 22 are formed by coating a positive current collector 231, and a negative current collector 221 with positive active material 23a and negative active material 22a, respectively, while leaving uncoated regions 23b, 22b along the long-side edges of the electrodes. The electrode assembly 20 is then formed by horizontally winding these electrodes with a separator 21, in a jelly roll configuration. In one embodiment, the positive current collector 231 is fabricated of aluminum, while the negative current collector 221 is fabricated of copper.

According to the embodiment shown, the uncoated regions 23b, 22b, that is, the regions of the current collectors to which no active materials are applied, are formed at the long sides of the positive and negative electrodes 23, 22. Here, the uncoated regions 23b, 22b of each positive and negative electrode are arranged in opposite directions, with the uncoated region 23b of the positive electrode 23 extending up, and the uncoated region 22b of the negative electrode 22 extending down, with the separator 21 in between.

Once the electrode assembly 20 is wound, the uncoated regions 23b, 22b are arranged to extend from either side of the electrode assembly 20. In particular, the positive uncoated region 23b extends out of the electrode assembly 20 on top, while the negative uncoated region 22b extends out at the bottom. Accordingly, the electrode assembly 20 has a shape wherein the positive uncoated region 23b protrudes from the top, and the negative uncoated region 22b protrudes from the bottom.

The positive current collecting plate 70 is then arranged to contact the positive uncoated region 23b of the positive electrode 23 extending up from the electrode assembly 20, and a negative current collecting plate 50 is arranged to contact the uncoated region 22b of the negative electrode 22 extending down from the electrode assembly 20. The negative current collecting plate 50 is additionally fixed to the electrode assembly 20 by welding.

Here, the current collecting plates 50, 70 are fabricated of the same materials as the corresponding current collectors. For this embodiment, the positive current collecting plate 70 is fabricated of aluminum, while the negative current collecting plate 50 is fabricated of copper. Accordingly, the negative current collecting plate 50 and the negative uncoated region 22b comprise the same material, in this embodiment, copper, and contact each other. However, a problem arises in that the negative current collecting plate 50 is difficult to fix to the negative uncoated region 22b since it is difficult to weld copper to copper.

Therefore, in order to solve this problem, the present invention suggests the following modifications to the negative current collecting plate.

Figure 3:
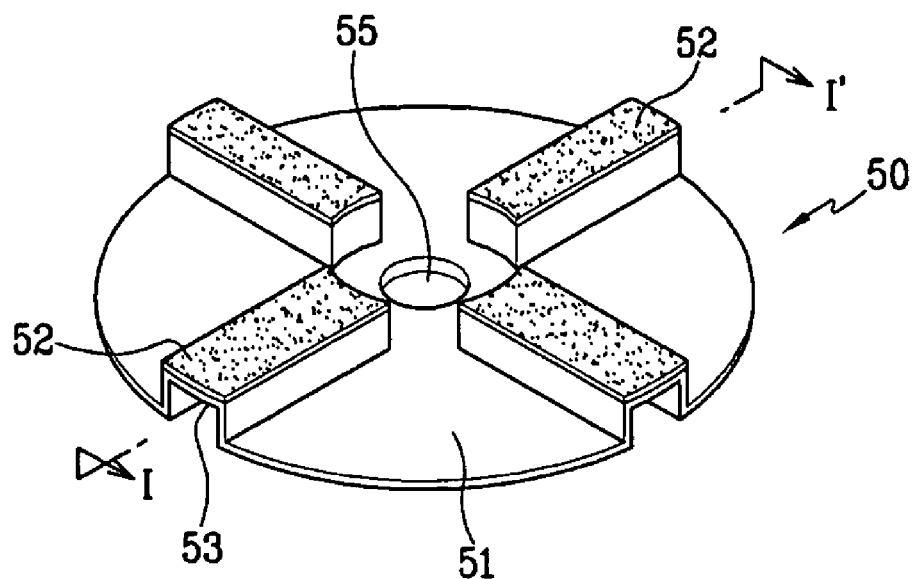
FIG. 3 is a perspective view of a negative current collecting plate according to an embodiment of the present invention.
Figure 4:
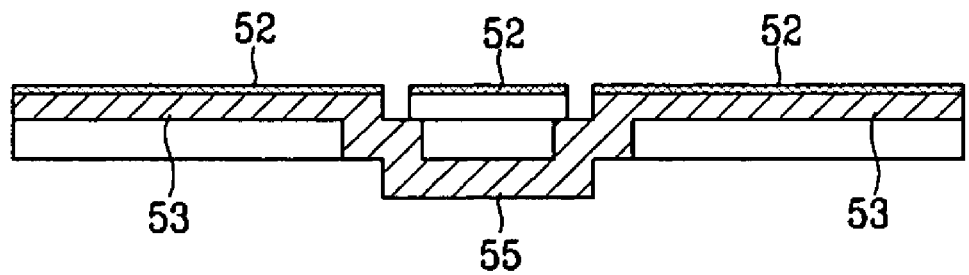
FIG. 4 is a cross sectional view taken along line I-I' of FIG. 3.

FIG. 3 is a perspective view of a negative current collecting plate 50 according to the embodiment of the present invention, and FIG. 4 is a cross sectional view of FIG. 3 along line I-I'.

Referring to these drawings along with FIG. 1, the negative current collecting plate 50 of this embodiment of the present invention includes a plurality of first contact regions 53 which are in contact and fixed to the negative uncoated region 22b, and a second contact region 55, which is fixed to the case 11. The contact regions 53, 55, are provided on a plate 51 shaped the same as the electrode assembly 20.

According to this embodiment, the plate 51 is fabricated of copper in a disc shape. However, it is not limited thereto and can be varied, as long as it keeps generally the same shape as the electrode assembly 20.

According to this embodiment, the first contact regions 53 are fabricated as raised regions extending radially from the center of the plate 51, with protruding portions extending up toward the negative current collector 22. Similarly, the second contact region 55 comprises a disc-shaped region which extends downwardly from the plate 51 toward the case 11. According to this embodiment, the first and second contact regions 53, 55 may be formed by stamping the plate 51 using techniques well known in the art. It should be apparent that while this embodiment of the present invention includes four radially extending contact regions, many other variations are possible.

The first contact regions have a surface-treatment layer 52 to prevent the metal from being oxidized by an electrolyte and to facilitate the welding of the current collecting plate with the negative uncoated region 22b, that is to say, since the negative uncoated region 22b and the negative current collecting plate 50 are fabricated of the same material, i.e., copper, and are therefore difficult to weld together, the surface-treatment layer aids in the welding of the two together.

Examples of suitable materials for the surface-treatment include nickel, tin, and zinc. However, any suitable material other than copper can be used. Among the possible materials, nickel is preferred. In one embodiment of the invention, the surface-treatment layer is provided in a thickness ranging from 1 to 50 micrometers. When the thickness is less than 1 micrometer, the surface-treatment effect is not sufficiently realized. When the thickness is more than 50 micrometers, the conductivity of the current collecting plate may deteriorate.

While according to the invention, it is advantageous to provide a surface-treatment on the first contact regions, it is not advantageous to surface-treat the second contact region, but rather, the second contact region is left without a surface-treatment layer. Therefore, during the fabrication of the surface-treatment layers 52 on the first contact regions 53, the second contact region 55 should be covered with a patterned mask to expose the other regions of the negative current collecting plate 50 except the second contact region 55.

The surface-treatment layer 52 can be applied using method including coating or cladding methods. The coating method can include methods such as electroplating or electroless plating methods.

Once the surface-treatment layer 52 has been applied to the negative current collecting plate 50, the negative current collecting plate 50 is positioned on an electrode assembly 20 in contact with the uncoated region 22b of the negative electrode 22. Then, the negative current collecting plate 50 is welded to the uncoated region 22b of the negative electrode 22, preferably by laser welding. Because the welding is performed through a hetero-junction between copper and a metal other than copper, the negative current collecting plate 50 is easily fixed to the negative uncoated region 22b.

A positive current collecting plate 70, like the negative current collecting plate 50, can be positioned to the uncoated region 23b of the positive electrode 23.

Figure 5:
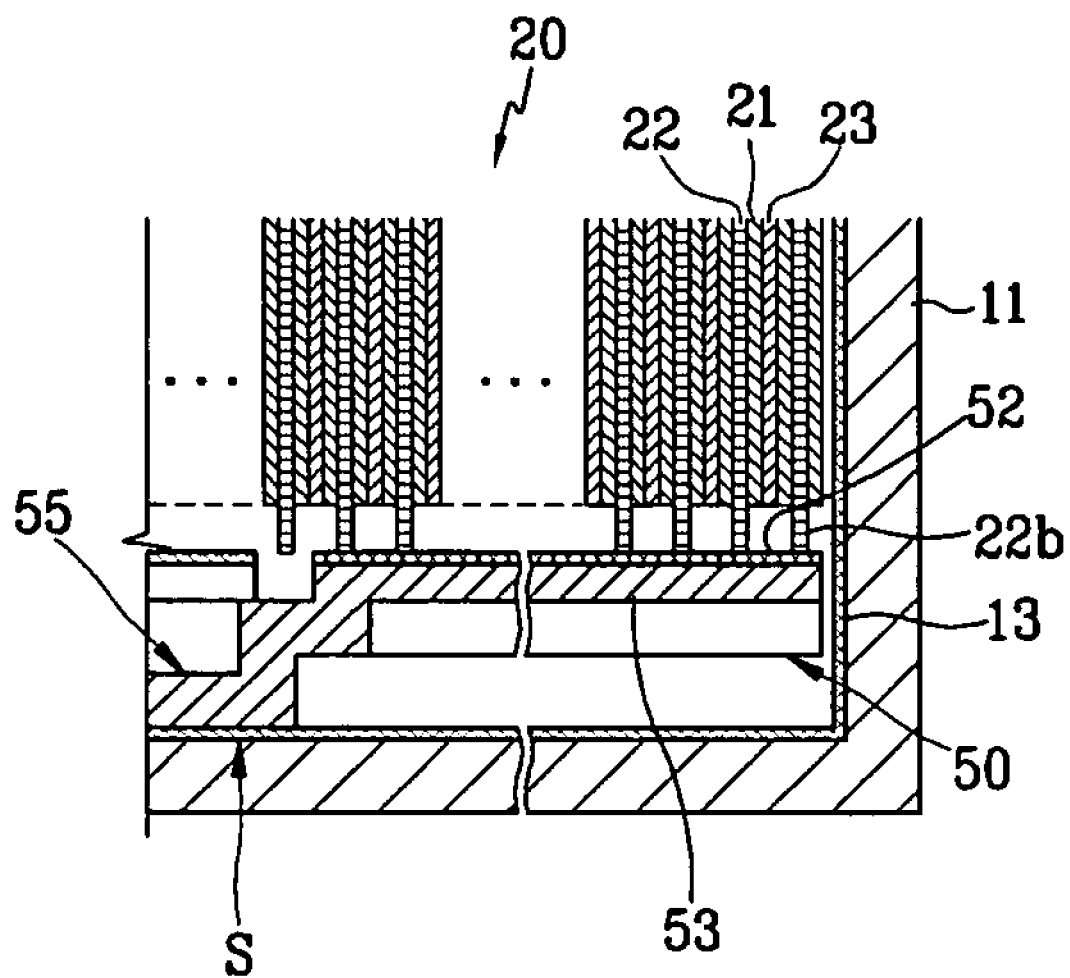
FIG. 5 shows the contact relationship between an uncoated region of a negative electrode and a negative current collecting plate and between a negative current collecting plate and a case.

An electrode assembly 20 with the negative current collecting plate 50 and the positive current collecting plate 70 fixed to it is then inserted into a case 11 with the positive current collecting plate 70 facing toward the cap assembly 30. Accordingly, the negative current collecting plate 50 connected to the negative electrode 22 contacts the bottom of the case 11 and is fixed thereto such as by resistance welding. Specifically, the second contact region 55 which protrudes toward and contacts the bottom of the case 11 is fixed to the case 11, forming a junction face S, as shown in FIG. 5. Resistance welding is performed by inserting a resistance welding bar into the case 11 through a hole 77 (FIG. 1) formed on the center of the positive current collecting plate. Here, it is advantageous to plate the inside of the case with a metal other than copper to protect it from oxidation, forming a metal layer 13. Furthermore, since the junction face S is formed at a hetero-junction between copper and a different metal, the welding is simplified. Suitable metals for plating for the case 11 include nickel, tin, and zinc. By fixing the negative electrode to the case via the negative current collecting plate, the case 11 acts as the anode of the battery.

Then, the electrode assembly 20 is impregnated with an electrolyte provided to the case 11 through an opening thereof. The positive current collecting plate 70 is electrically connected to the positive electrode 23 with the cap assembly 30 through a lead wire 60 such that the cap assembly forms the cathode of the battery.

Here, the cap assembly 30 can be connected to the electrode assembly 20 by tab structures or a plate structure.

The secondary battery of the present invention has advantages of being more structurally stable due to the stronger welds of the negative current collecting plate with the uncoated region of the negative electrode, and exhibits improved current collecting efficiency because of the decreased contact resistance between the negative current collecting plate and the negative electrode.

The secondary battery may be useful as an energy source for driving a motor which is used for hybrid electric vehicles (HEV), electric vehicles (EV), wireless cleaners, motorbikes, motor scooters, and the like, which require high power performance.

While the present invention has been described in detail with reference to certain embodiments, those skilled in the art will appreciate that various modifications and substitutions can be made thereto without departing from the spirit and scope of the present invention as set forth in the appended claims.

What is claimed is:

1. A secondary battery comprising:
   an electrode assembly comprising a positive electrode, a negative electrode, and a separator interposed therebetween, the positive electrode, negative electrode and separator wound in a spiral;
   a case in which the electrode assembly is contained;
   a cap assembly which seals the case and which is electrically connected to the electrode assembly; and
   a negative current collecting plate electrically connecting the negative electrode and the case, the negative current collecting plate comprising at least one partially surface-treated region to which the negative electrode of the electrode assembly is fixed, wherein the negative current collecting plate comprises at least one first contact region upon which the at least one partially surface-treated region is located, and at least one second contact region which is fixed to the case, and the negative electrode and the first contact region comprise a first material, and the first contact region is surface-treated with a second material different from the first material to form the surface-treated region.

2. The secondary battery of claim 1, wherein the negative current collecting plate comprises a first metal, and an inside surface of the case is treated with a second metal different from the first metal.

3. The secondary battery of claim 1, wherein the second contact region protrudes toward the case.

4. The secondary battery of claim 3, wherein the second contact region comprises a circular region located in the center of the negative current collecting plate.

5. The secondary battery of claim 4, wherein the second contact region is connected to the case by resistance welding.

6. The secondary battery of claim 1, wherein each of the positive electrode and the negative electrode includes an uncoated region with no active material, and the partially surface-treated region of the first contact region is fixed to the uncoated region of the negative electrode.

7. The secondary battery of claim 6, wherein a plurality of first contact regions are provided extending toward the uncoated region of the negative electrode.

8. The secondary battery of claim 7, wherein each of the first contact regions comprises a radially extending first contact region.

9. The secondary battery of claim 8, wherein the negative current collecting plate is fixed to the uncoated region of the negative electrode by laser-welding.

10. The secondary battery of claim 1, wherein the electrode assembly has a cylindrical or prismatic shape.

11. A secondary battery comprising:

an electrode assembly comprising a positive electrode, a negative electrode, and a separator interposed therebetween, the positive electrode, negative electrode and separator wound in a spiral;

a case in which the electrode assembly is contained;

a cap assembly which seals the case and which is electrically connected to the electrode assembly; and a negative current collecting plate comprising at least one contact region having a partially surface-treated region by which the electrode assembly is fixed to the negative current collecting plate, wherein the negative electrode and the negative current collecting plate both comprise copper and the partially surface-treated region comprises a metal other than copper, and wherein the copper of the negative electrode is fixed to the metal other than copper of the partially surface-treated region.

12. The secondary battery of claim 11, wherein the negative current collecting plate comprises a first metal, and an inside surface of the case is treated with a second metal different from the first metal.

13. The secondary battery of claim 11 wherein the negative current collecting plate further comprises a second contact region protruding toward the case.

14. The secondary battery of claim 13, wherein the second contact region comprises a circular disc located in the center of the negative current collecting plate.

15. The secondary battery of claim 14, wherein the second contact region is connected to the case by resistance welding.

16. The secondary battery of claim 11, wherein the first contact region comprises a plurality of radially extending regions.

17. The secondary battery of claim 1, wherein the secondary battery is used for driving a motor.

* * * * *